US011560838B2

(12) United States Patent
Allam

(10) Patent No.: US 11,560,838 B2
(45) Date of Patent: *Jan. 24, 2023

(54) SYSTEMS AND METHODS FOR POWER PRODUCTION USING A CARBON DIOXIDE WORKING FLUID

(71) Applicant: 8 Rivers Capital, LLC, Durham, NC (US)

(72) Inventor: Rodney John Allam, Chippenham (GB)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,317

(22) Filed: Jan. 14, 2021

(65) Prior Publication Data
US 2021/0239043 A1 Aug. 5, 2021

Related U.S. Application Data

(63) Continuation of application No. 16/289,804, filed on Mar. 1, 2019, now Pat. No. 10,914,232.

(51) Int. Cl.
*F02C 3/34* (2006.01)
*F01K 23/10* (2006.01)
*F01K 25/10* (2006.01)

(52) U.S. Cl.
CPC ............... *F02C 3/34* (2013.01); *F01K 23/10* (2013.01); *F01K 25/103* (2013.01); *B01D 2257/504* (2013.01); *B01D 2257/80* (2013.01)

(58) Field of Classification Search
CPC .... F02C 3/04; F02C 3/34; F01K 23/10; F01K 23/103; B01D 2257/504; B01D 2257/80; B01D 53/62
See application file for complete search history.

(56) References Cited

U.S. PATENT DOCUMENTS

| 3,369,361 | A | 2/1968 | Craig |
| 3,376,706 | A | 4/1968 | Angelino |
| 3,503,208 | A | 3/1970 | Schmidt |
| 3,544,291 | A | 12/1970 | Schlinger et al. |
| 3,736,745 | A | 6/1973 | Karig |

(Continued)

FOREIGN PATENT DOCUMENTS

| JP | 2225905 | 9/1990 |
| JP | 2001-132472 | 5/2001 |

(Continued)

OTHER PUBLICATIONS

Bryant et al., "An Analysis and Comparison of the Simple and Recompression Supercritical CO2 Cycles," *Supercritical CO2 Power Cycle Symposium*, May 25, 2011. XP055218674, pp. 1-8.

(Continued)

*Primary Examiner* — Steven M Sutherland
(74) *Attorney, Agent, or Firm* — Womble Bond Dickinson (US) LLP

(57) ABSTRACT

The present disclosure relates to systems and methods for power production utilizing a recirculating working fluid. In particular, a portion of the recirculating working fluid can be separated from the main stream of recirculating working fluid as a bypass stream that can be compressed for adding heat to the system.

19 Claims, 3 Drawing Sheets

(56) References Cited

U.S. PATENT DOCUMENTS

| | | | |
|---|---|---|---|
| 3,754,406 A | 8/1973 | Allam | |
| 3,796,045 A | 3/1974 | Foster-Pegg | |
| 3,837,788 A | 9/1974 | Craig et al. | |
| 3,868,817 A | 3/1975 | Marion et al. | |
| 3,971,211 A | 7/1976 | Wethe et al. | |
| 3,976,443 A | 8/1976 | Paull et al. | |
| 4,132,065 A | 1/1979 | McGann | |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,957,515 A | 9/1990 | Hegarty | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,345,756 A | 9/1994 | Jahnke et al. | |
| 5,353,721 A | 10/1994 | Mansour et al. | |
| 5,394,686 A | 3/1995 | Child et al. | |
| 5,415,673 A | 5/1995 | Hilton et al. | |
| 5,421,166 A | 6/1995 | Allam et al. | |
| 5,507,141 A | 4/1996 | Stigsson | |
| 5,520,894 A | 5/1996 | Heesink et al. | |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Asen et al. | |
| 6,333,015 B1 | 12/2001 | Lewis | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 | 2/2004 | Frutschi | |
| 6,764,530 B2 | 7/2004 | Iijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,089,743 B2 | 8/2006 | Frutschi et al. | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,281,590 B2 | 10/2007 | Van de Waal | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,363,764 B2 | 4/2008 | Griffin et al. | |
| 7,377,111 B2 | 5/2008 | Agnew | |
| 7,387,197 B2 | 6/2008 | Sprouse et al. | |
| 7,402,188 B2 | 7/2008 | Sprouse | |
| 7,469,544 B2 | 12/2008 | Farhangi | |
| 7,469,781 B2 | 12/2008 | Chataing et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,665,291 B2 | 2/2010 | Anand et al. | |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,739,874 B2 | 6/2010 | Nigro | |
| 7,740,671 B2 | 6/2010 | Yows et al. | |
| 7,740,672 B2 | 6/2010 | Sprouse | |
| 7,814,975 B2 | 10/2010 | Hagen et al. | |
| 7,826,054 B2 | 11/2010 | Zillmer et al. | |
| 7,827,797 B2 | 11/2010 | Pronske et al. | |
| 7,874,140 B2 | 1/2011 | Fan et al. | |
| 7,882,692 B2 | 2/2011 | Pronske et al. | |
| 7,927,574 B2 | 4/2011 | Stewart | |
| 7,934,383 B2 | 5/2011 | Gutierrez et al. | |
| 7,950,243 B2 | 5/2011 | Gurin | |
| 8,043,588 B2 | 10/2011 | Hustad et al. | |
| 8,088,196 B2 | 1/2012 | White et al. | |
| 8,109,095 B2 | 2/2012 | Henriksen et al. | |
| 8,220,248 B2 | 7/2012 | Wijmans et al. | |
| 8,596,075 B2 | 12/2013 | Allam et al. | |
| 8,776,532 B2 | 7/2014 | Allam et al. | |
| 8,986,002 B2 | 3/2015 | Palmer et al. | |
| 9,068,743 B2 | 6/2015 | Palmer et al. | |
| 9,352,270 B2 * | 5/2016 | Krutka | B01D 53/12 |
| 2002/0134085 A1 | 9/2002 | Frutschi | |
| 2003/0131582 A1 | 7/2003 | Anderson et al. | |
| 2003/0221409 A1 | 12/2003 | McGowan | |
| 2004/0011057 A1 | 1/2004 | Huber | |
| 2004/0123601 A1 | 7/2004 | Fan | |
| 2004/0134197 A1 | 7/2004 | Marin et al. | |
| 2005/0126156 A1 | 6/2005 | Anderson et al. | |
| 2006/0242907 A1 | 11/2006 | Sprouse et al. | |
| 2007/0180768 A1 | 8/2007 | Briesch et al. | |
| 2007/0274876 A1 | 11/2007 | Chiu et al. | |
| 2008/0010967 A1 | 1/2008 | Griffin et al. | |
| 2008/0104958 A1 | 5/2008 | Finkenrath et al. | |
| 2008/0115500 A1 | 5/2008 | MacAdam et al. | |
| 2008/0166672 A1 | 7/2008 | Schlote et al. | |
| 2008/0173584 A1 * | 7/2008 | White | F25J 3/0223 210/656 |
| 2008/0187877 A1 | 8/2008 | Fitzsimmons et al. | |

(56) References Cited

U.S. PATENT DOCUMENTS

| | | |
|---|---|---|
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0229271 A1 | 9/2009 | Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0300063 A1 | 12/2010 | Palmer et al. |
| 2011/0036011 A1 | 2/2011 | Sprouse et al. |
| 2011/0012773 A1 | 6/2011 | Freund et al. |
| 2011/0179799 A1 | 7/2011 | Allam et al. |
| 2011/0233940 A1 | 9/2011 | Aoyama et al. |
| 2011/0239651 A1 | 10/2011 | Aoyama et al. |
| 2012/0067054 A1 | 3/2012 | Palmer et al. |
| 2012/0067056 A1 | 3/2012 | Palmer et al. |
| 2012/0073261 A1 | 3/2012 | Palmer et al. |
| 2012/0237881 A1 | 9/2012 | Allam et al. |
| 2013/0104525 A1 | 5/2013 | Allam et al. |
| 2013/0118145 A1 | 5/2013 | Palmer et al. |
| 2013/0205746 A1 | 8/2013 | Allam et al. |
| 2015/0020497 A1 | 1/2015 | Iwai et al. |
| 2018/0058318 A1 | 3/2018 | Allam et al. |
| 2018/0073430 A1* | 3/2018 | Forrest ............... C10J 3/485 |

FOREIGN PATENT DOCUMENTS

| | | |
|---|---|---|
| WO | WO 95/12757 | 5/1995 |
| WO | WO 2014/151656 | 9/2014 |

OTHER PUBLICATIONS

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

(IAEA) Moisseytsev et al., "Supercritical Carbon Dioxide Brayton Cycle for SFR Applications: Optimization, Transient Analysis, and Control," *IAEA International Atomic Energy Agency, Proceedings of an International Conference: Fast Reactors and Related Fuel Cycles: Challenges and Opportunities FR13*, Paris, France, Mar. 4, 12013, XP040574212, pp. 1-10.

E.I. Yantovskii et al., "Computer Exergonomics of Power Plants Without Exhaust Gases," Energy Convers. Mgmt., Publ. 1992, vol. 33, No. 5-8, pp. 405-412.

\* cited by examiner

SYSTEMS AND METHODS FOR POWER PRODUCTION USING A CARBON DIOXIDE WORKING FLUID

CROSS-REFERENCE TO RELATED APPLICATIONS

The present application is a continuation of U.S. patent application Ser. No. 16/289,804, filed Mar. 1, 2019, which claims priority to U.S. Provisional Patent Application No. 62/637,542, filed Mar. 2, 2018, the disclosures of which is are incorporated herein by reference in their entirety.

FIELD OF THE DISCLOSURE

The present disclosure relates to systems and methods for power production using a carbon dioxide working fluid.

BACKGROUND

Utilization of $CO_2$ (particularly in supercritical form) as a working fluid in power production has been shown to be a highly efficient method for power production. See, for example, U.S. Pat. No. 8,596,075 to Allam et al., the disclosure being incorporated herein by reference, which describes the use of a directly heated $CO_2$ working fluid in a recuperated oxy-fuel Brayton cycle power generation system with virtually zero emission of any streams to the atmosphere. In order to increase process efficiency, such systems and methods have typically utilized a significant heat input below a temperature of about 400° C. This extra, low temperature heat input has been used to compensate for the rapid increase in the ratio of specific heats at lower absolute temperatures for the high pressure recycle $CO_2$ stream and the low pressure turbine exhaust stream during heat transfer in the recuperative heat exchanger.

For example, when considering a recycle $CO_2$ pressure of 300 bar and a turbine exhaust pressure of 30 bar, the ratio of specific heats for $CO_2$ in the hot end of the recuperator heat exchanger at 700° C. is 1.032 while ratio near the cold end at 100° C. is 1.945. This increase means that the turbine exhaust stream no longer has sufficient heat content in the low temperature end of the recuperator heat exchanger to provide more than about half the heat required to raise the temperature of the total recycle high pressure $CO_2$ stream plus the oxygen required for fuel gas combustion.

The above-discussed deficit has been compensated for in the past using various means for addition of heat, as noted above. Known methods for providing the additional heat, however, have various drawbacks, including requiring significant power consumption, increasing costs due to the need for added equipment, and increasing process complexity. For example, known systems have provided added heating to a power production system from an air separation plant, but utilizing such source of added heating can require specialized controls, particularly when demand for power changes rapidly. Accordingly, there remains a need in the art for further systems and method for power production with improved efficiency and particularly systems and methods that provide methods of providing additional heating that can be required in a power cycle utilizing a working fluid such as carbon dioxide.

SUMMARY OF THE DISCLOSURE

The present disclosure relates to systems and methods for power production wherein a carbon dioxide ($CO_2$) working fluid is utilized. The $CO_2$ stream utilized as the working fluid is a recycled $CO_2$ stream that is compressed, heated with the heat of combustion in a reactor (e.g., combustion of a hydrocarbon fuel or other fuel material), expanded for power production in a turbine, cooled in a recuperative heat exchanger, purified (e.g., by removal of water, excess carbon dioxide, or other materials), and then compressed and recycled by heating in the recuperative heat exchanger. In some embodiments, liquid water and high pressure $CO_2$ resulting from the combustion of hydrogen and carbon that can be present in the fuel can be provided as separate products from the power cycle. The present systems and methods may be particularly defined in relation to the configuration of the $CO_2$ stream compression system coupled with the configuration of the heat exchange system, particularly in the low temperature end of the recuperative heat exchanger. Such configurations beneficially can achieve and exceed efficiencies seen in known power cycles without any need for externally provided heat derived from adiabatic compression of gas streams.

In one or more embodiments, the recuperative heat exchanger can have a first hot end section. This hot end section can be defined across a functioning length which progressively cools and which extends to a point where the temperature of the turbine outlet stream (which is being cooled) and the recycle $CO_2$ stream (which is being heated) are approximately equivalent—e.g., the two streams have a temperature difference in the range of about 2° C. to about 20° C. This point can be defined as the "pinch point" of the recuperative heat exchanger. The temperature difference in this section of the recuperative heat exchanges starts at the defined hot end temperature difference but varies across the functioning length of the hot end section as the ratio of the specific heats of the high pressure recycle $CO_2$ stream and the cooling turbine outlet stream increases at lower temperatures.

The second section of the recuperative heat exchanger extends from the above-defined pinch point across a functioning length which progressively cools and which extends to a point where the temperature is approximately equivalent to the water dew-point of the turbine exhaust stream. This point can be defined as the "dew-point" of the recuperative heat exchanger. In practice the fuel gases used in the combustion reactor can contain a large proportion of hydrogen which on combustion with oxygen forms water. As such, the turbine exhaust can be expected to contain about 4% to about 7% molar water vapour content. In this second temperature section of the recuperative heat exchanger, the ratio of specific heats of the high pressure recycle $CO_2$ stream relative to the low pressure turbine exhaust increase rapidly. Preferably in this section, the flow rate of the high pressure recycle $CO_2$ stream is significantly reduced to maintain a positive temperature difference. Preferably, the flow rate of the high pressure recycle $CO_2$ stream in this section is reduced to a range of about 40% to about 70% of the total recycle high pressure $CO_2$ stream flow. The maximum temperature difference between the heating, high pressure recycle $CO_2$ stream and the cooling, turbine exhaust stream can be in the range of about 2° C. to about 20° C. in some embodiments.

A third section of the recuperative heat exchanger extends from the above-defined dew-point across a functioning length which progressively cools and which extends to the cold end of the heat exchanger. The cooling of the water vapor content of the turbine exhaust (e.g., water derived from combustion of the hydrogen present in the fuel gas) to achieve condensation thereof releases a large amount of heat that provides the energy required to heat the total recycle $CO_2$ stream (as well as the oxygen required for combustion) to a temperature that closely approaches the temperature at the turbine exhaust dew-point of the recuperative heat exchanger (e.g., to within a temperature differential in the range of about 2° C. to about 20° C.). In practice at least 80% to 95% of the steam content of the turbine exhaust will condense in the third section of the recuperative heat exchanger providing sufficient additional heat to allow the total recycle $CO_2$ stream and oxygen stream to be heated in the third section. In section three of the recuperative heat exchanger, due to the increasing ratio of specific heat values for the high pressure $CO_2$ stream relative to the low pressure mainly $CO_2$ turbine exhaust stream, the temperature difference will first increase in this section as the turbine exhaust cools and a bulk portion of the water vapor condenses then reduce to a defined pinch temperature difference, in the range 2° C. to 20° C., at the cold end of the recuperator heat exchanger.

The requirements for an optimum design of the recuperative heat exchanger further can define the requirements for a viable solution based on the $CO_2$ recycle compressor system configuration together with the design of the second and third sections of the recuperative heat exchanger.

The total flow of the recycle $CO_2$ stream plus the stream of oxygen required for combustion are both heated in the third lowest temperature section of the recuperative heat exchanger up to a close temperature approach to the dewpoint of the turbine exhaust stream. In some embodiments, about 30% to about 50% of the recycle $CO_2$ stream is removed from the heat exchanger at this point leaving about 50% to about 70% of the total $CO_2$ recycle stream plus optionally oxygen to be heated in the second section of the recuperative heat exchanger. Extracting a portion of the total heating $CO_2$ stream ensures that the remaining flow of high pressure recycle $CO_2$ plus oxygen being heated in section two is sufficient to maintain a minimum defined positive temperature difference in this section of the recuperative heat exchanger. In some embodiments, the extracted $CO_2$ stream can contain at least part of the oxygen stream.

In order to facilitate the optimum operation of the recuperative heat exchanger, it can be particularly beneficial to increase the temperature of the fraction of the recycle $CO_2$ stream and the oxygen stream that is removed from the recuperative heat exchanger between sections two and three and return these streams to the recuperative heat exchanger between sections one and two at the temperature corresponding to the recycle $CO_2$ stream plus oxygen stream temperature at the pinch point, which defines the turbine outlet point of section one of the recuperative heat exchanger. In order to achieve this increase in temperature, it can be useful to compress the total flow of the recycle $CO_2$ stream and the oxygen stream up to the turbine inlet pressure and to compress these streams adiabatically so that the compressor outlet is at the required higher temperature corresponding to the inlet temperature of the recycle $CO_2$ stream and oxygen stream entering section one of the recuperative heat exchanger. The total flow of the high pressure recycle $CO_2$ stream and optionally the oxygen stream removed from the recuperative heat exchanger at the junction of the third and second sections can be at a temperature near to and below the turbine exhaust dewpoint. Since the discharge pressure and inlet temperature of the bypass compressor stage are defined, this can define the inlet pressure of the bypass compressor, which can be in a range of about 80 bar to about 140 bar, preferably about 95 bar to about 115 bar. This stream is compressed to the turbine inlet pressure in an adiabatic external compressor stage. The bypass compressor can be a single stage, high efficiency adiabatic compressor stage that can be incorporated as part of the recycle $CO_2$ compression system. The outlet temperature of this hot $CO_2$ compression stage will be approximately the same as the temperatures of the high pressure recycle $CO_2$ stream and at least part of the oxygen stream that have been heated in the second section of the recuperative heat exchanger. Optionally, oxygen required for combustion of the fuel can be mixed with the bypass $CO_2$ stream before entering section three in separate passages in the recuperative heat exchanger. The compressed bypass $CO_2+O_2$ stream passes through the first section of the recuperative heat exchanger in separate passages from the high pressure recycle $CO_2$. Alternatively, the bypass stream can be part of the recycle $CO_2$ stream with no added $O_2$ in which case the bypass stream can be added to the recycle high pressure $CO_2$ stream at a coincident temperature at the inlet point of the first recuperator stage.

The presently disclosed systems and methods beneficially can exhibit an overall efficiency that is at least as high as the prior art systems utilizing a recycled carbon dioxide working fluid stream, inclusive of systems having externally provided heat using indirect heat transfer from adiabatically compressed air in the cryogenic $O_2$ plant or from an adiabatically compressed part of the recycle $CO_2$ stream. The present systems and methods provide advantages including at least the elimination of all of the heat transfer systems requiring adiabatic $CO_2$ recycle and cryogenic oxygen plant air compression and associated high pressure heat exchangers. This can lead to significant cost savings, simpler more compact plant layout, and simpler control systems. Further, the present systems and methods can allow the cryogenic air separation plant power requirement to be reduced by 15% to 20%, and the capital cost of the air separation plant with its standard air compressors will be much lower. Similarly the $CO_2$ compression train can be simplified. The overall cost of a commercial plant utilizing systems and methods as described herein can be significantly lower with the elimination of the adiabatic compressor gas coolers and all of their piping and other systems, and the plot layout will be significantly reduced in area and complexity. There will be positive effects on the overall power system efficiency and a significant reduction in the cost of electricity produced.

In one or more embodiments, the present disclosure can relate specifically to a method of power production. Such method can comprise at least the following: passing a high pressure recycle $CO_2$ stream at a pressure of about 200 bar to about 500 bar into a combustor and mixing said high pressure $CO_2$ stream with combustion products derived from the combustion of a hydrocarbon fuel in an oxidant stream to produce a mixed gas stream at a temperature of about 700° C. to about 1,600° C.; expanding the mixed gas stream in a power producing turbine to a pressure of about 1 bar to about 50 bar to form an expanded, mixed gas stream; cooling the expanded, mixed gas stream in a recuperator heat exchanger by transferring heat to the recycle $CO_2$ stream that is passed to the combustor to form a cooled mixed gas stream; separating water from the cooled mixed gas stream and forming the recycle $CO_2$ stream; compressing the recycle $CO_2$ stream in a compressor to a pressure of about 65 bar to about 90 bar; cooling the compressed recycle $CO_2$ stream to provide a cooled high density near ambient temperature $CO_2$ stream having a specific gravity above about 0.5; withdrawing a bypass $CO_2$ stream and compressing this stream in a separate stage to a pressure of about 80 bar to about 140 bar, and preferably about 95 bar to about 115 bar; further compressing the remaining recycle $CO_2$ stream to a pressure of about 200 bar to about 500 bar to form the high pressure recycle $CO_2$ stream; passing the high pressure recycle $CO_2$ stream and the bypass $CO_2$ stream into the recuperator heat exchanger; withdrawing the bypass $CO_2$ stream from the heat exchanger upstream of a bypassed section of the heat exchanger, compressing the bypass $CO_2$ stream in an adiabatic bypass $CO_2$ compressor to a pressure of about 200 bar to about 500 bar, and combining the so-heated bypass $CO_2$ stream with the recycle $CO_2$ stream in the recuperator heat exchanger downstream from the bypassed section of the heat exchanger to form the high pressure recycle $CO_2$ stream; and recycling the high pressure recycle $CO_2$ stream to the combustor. In further embodiments, the method can be defined in relation to any one or more of the following statements, which may be combined in any number and order.

The quantity of bypass $CO_2$ is sufficient to give a positive minimum temperature difference in the bypassed section of the recuperator heat exchanger of about 2° C. to about 20° C.

The temperature of an inlet stream of the bypass compressor and an outlet stream of the bypass compressor is selected to give a positive minimum temperature difference in the bypassed section of the recuperator heat exchanger of about 2° C. to about 20° C.

An inlet pressure of the bypass compressor is about 80 bar to about 140 bar.

The method further comprises mixing an oxygen stream from an air separation plant with a portion of the high pressure recycle $CO_2$ stream to form the oxidant stream.

The method further comprises mixing an oxygen stream from an air separation plant with the bypass $CO_2$ stream to form an oxidant stream.

The method further comprises passing the oxidant stream through the recuperator heat exchanger in separate passages to the high pressure recycle $CO_2$ stream.

The total recycle $CO_2$ stream is passed through a recycle compressor after-cooler where it is cooled to near ambient temperature when its density is increased to at least 0.5 Kg/liter.

The cooled total recycle $CO_2$ stream is divided into a plurality of separate streams.

A first divided stream from the recycle $CO_2$ stream is compressed in a multi stage pump to a turbine inlet pressure and heated in the recuperator heat exchanger.

A second divided stream from the recycle $CO_2$ stream is mixed with an oxygen stream to form an oxidant stream having about 20% to about 30% molar oxygen and about 80% to about 70% molar $CO_2$, is optionally compressed to the turbine inlet pressure, and then is passed for heating through the recuperator heat exchanger.

The third divided stream is compressed to a pressure of about 80 bar to about 140 bar in a multistage pump and heated in the third stage of the recuperator heat exchanger and removed at a junction between a second section and a third section of the recuperator heat exchanger at a temperature approach to the turbine discharge stream of about 2° C. to about 20° C. The third divided stream is compressed adiabatically to the turbine inlet pressure in an adiabatic compressor with a discharge pressure equal to the turbine inlet system pressure, and the third divided stream is reinserted into the recuperator heat exchanger between a first section and the second section at a point where the temperature difference between the cooling turbine exhaust stream and the heating recycle $CO_2$ stream is about 2° C. to about 20° C.

The third divided $CO_2$ stream is mixed with an oxygen stream to form an oxidant stream having from about 10% to about 20% molar oxygen concentration to form simultaneously the oxidant stream and the bypass stream.

The oxygen is mixed with the recycle $CO_2$ stream to form the total oxidant flow using a single bypass compressor, and wherein one or more of the following conditions apply:

the total $CO_2$ recycle compressor discharge flow leaving the after-cooler at a density of at least 0.5 kg/liter is divided into two parts;

the first part is compressed to the turbine inlet system pressure in a multi stage pump and heated in the recuperator heat exchanger;

the second part that has been compressed to the bypass compressor inlet pressure in a multi stage pump is heated in a heat exchanger against heat of compression derived from the recycle $CO_2$ compressor before entering the third section of the recuperator heat exchanger;

the oxygen stream is mixed with the bypass $CO_2$ flow to form the oxidant flow which enters section three of the recuperator heat exchanger;

the temperature of the oxidant stream entering section three of the recuperator heat exchanger is adjusted to minimize the cold end temperature difference of the recuperator heat exchanger;

the oxidant stream has between 10% and 20% molar $O_2$ concentration;

the oxidant stream leaves the recuperator heat exchanger between sections 2 and 3 where the temperature difference between the cooling turbine discharge stream and the heating streams is about 2° C. to about 20° C.;

the oxidant stream is compressed adiabatically and re-enters the recuperator heat exchanger between sections 2 and 3 where the temperature difference between the cooling turbine discharge stream and the heating streams is about 2° C. to about 20° C.

The turbine discharge stream leaving section 2 of the recuperator heat exchanger is at its water dew point.

In one or more embodiments, the product $CO_2$ formed from combustion of the carbon contained in the fuel is produced as a compressed gaseous or supercritical product at pressures between the turbine discharge leaving the direct contact cooler and the high pressure recycle $CO_2$ flow entering the recuperator heat exchanger.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods for power production utilizing a recycle $CO_2$ stream as a working fluid. Non-limiting examples of elements that may be included in a power production plant (and method of operation thereof) according to the present disclosure are described in U.S. Pat. Nos. 8,596,075, 8,776,532, 8,869,889, 8,959,887, 8,986,002, 9,062,608, 9,068,743, 9,410,481, 9,416,728, U.S. Pat. Pub. No. 2010/0300063, U.S. Pat. Pub. No. 2012/0067054, U.S. Pat. Pub. No. 2012/0237881, and U.S. Pat. Pub. No. 2013/0213049, the disclosures of which are incorporated herein by reference.

Figure 1:
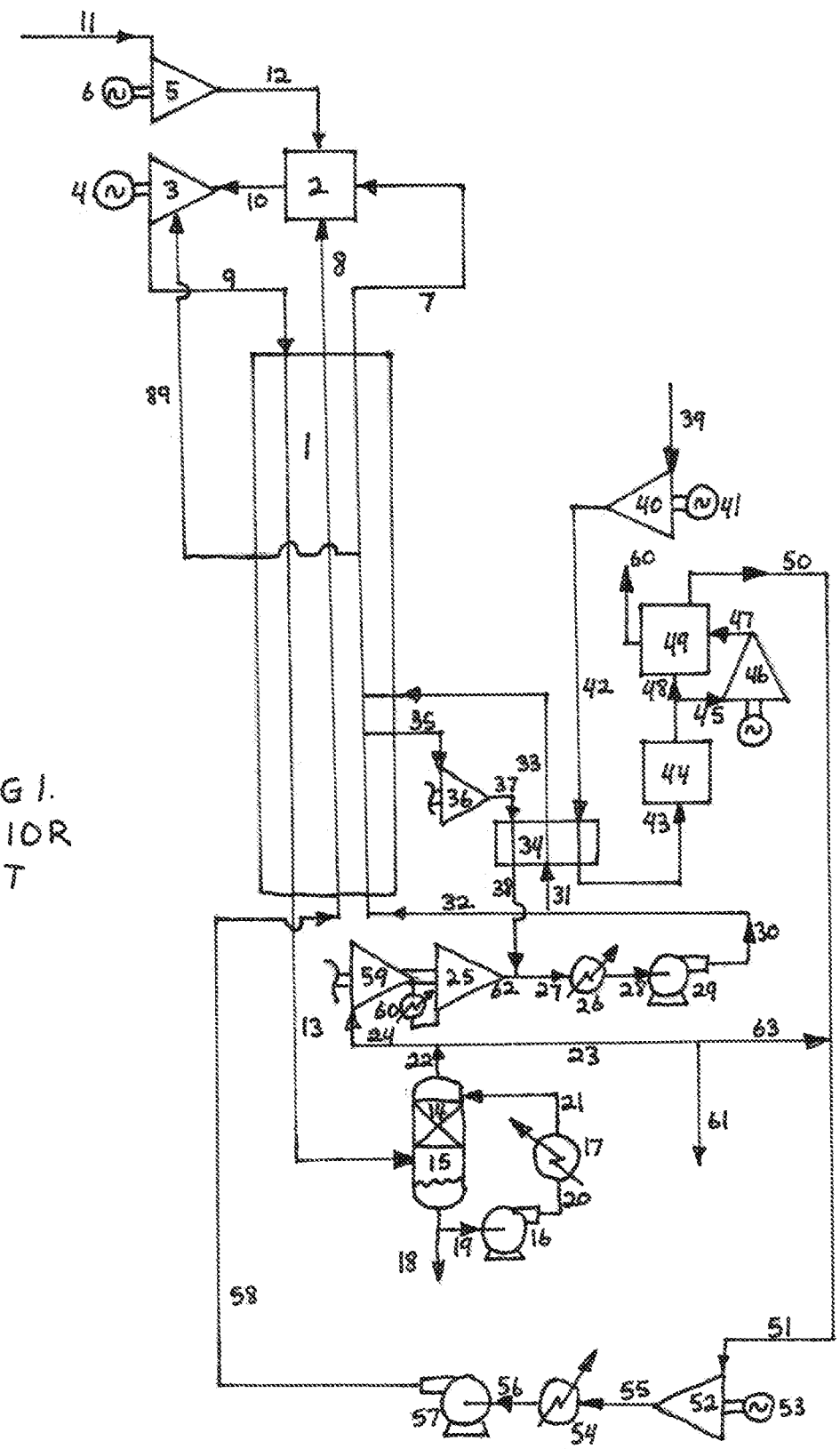
FIG. 1 is a flow diagram of a power cycle requiring addition of heat from an external heat source.

A known, high efficiency power production cycle is illustrated in FIG. 1. As seen therein, a $CO_2$ stream 7 at 304 bar is heated to 700° C. in a multi-stream heat exchanger 1. The $CO_2$ stream 7 enters a combustor 2 where it mixes with the combustion products arising from combustion of a methane stream 12 compressed to a pressure of about 304 bar and a temperature of about 251° C. in a compressor 5 driven by an electric motor 6 burning in an oxidant stream 8, which has a composition of approximately 25% oxygen and 75% $CO_2$ molar and a pressure of about 304 bar. The resulting mixed stream 10 enters the turbine 3 driving an electric generator 4 at about 1150° C. and about 300 bar and is expanded to about 30 bar and about 720° C. leaving as stream 9. The 30 bar stream cools in the heat exchanger 1 transferring heat to the high pressure $CO_2$ recycle stream 7 and leaves at a temperature of about 65° C. as stream 13. It is further cooled in a direct contact water cooler 15, which has a packed section 14 and a circulating water section comprising a pump 16 and an indirect water cooled heat exchanger 17, which directs water flows 19, 20 and 21 to the top of the packing section. The excess liquid water 18 produced in the $CH_4$ combustor stream is removed from the base of the packed tower 15. The cooled $CO_2$ stream 22 is split, and a major portion 24 enters a two stage intercooled $CO_2$ compressor including first stage compressor 59, second stage compressor 25, and intercooler 60 where it is compressed to about 67.5 bar. The turbine requires a cooling and seal gas high pressure $CO_2$ stream 89 which is extracted from the heating recycle high pressure $CO_2$ stream at an appropriate point in the heat exchanger 1.

The illustrated power cycle requires a significant quantity of externally generated heat to be provided to the high pressure $CO_2$ stream at a temperature level below 400° C. This heat is derived from two sources that provide heat of compression. The first is the adiabatically compressed air stream 42 at 5.7 bar and 226° C. from the cryogenic air separation plant main feed air compressor 40 receiving air stream 39 and driven by electric motor 41. The second is a portion of the $CO_2$ 35 taken from heat exchanger 1 at a temperature of 135° C. and adiabatically compressed in compressor 36 to 68 bar to produce stream 37 at 226° C. These two streams are passed through heat exchanger 34 where they heat a 304 bar $CO_2$ stream 31 from 50° C. to 221° C. The cooled $CO_2$ stream 38 and the $CO_2$ recycle compressor discharge stream 62 combine to form the total $CO_2$ stream 27 which is cooled in the cooling water heat exchanger 26 to produce product stream 28 at 19.7° C. This stream of high-density $CO_2$ super-critical fluid is compressed to 305 bar in a multi-stage pump 29. The discharge stream 30 at 50° C. divides into a main portion 32 which enters the recuperative heat exchanger 1 and a minor stream 31 that is heated in heat exchanger 34 to 221° C. against the cooling adiabatically compressed streams 37 and 42 producing stream 33 that rejoins the main high pressure $CO_2$ flow in heat exchanger 1 at its corresponding temperature. The cooled air stream 43 at 56° C. enters the cryogenic air separation system. This comprises an air cooling and purification unit 44 which has a direct contact air cooler, a water chiller, and a switching duel bed thermally regenerated adsorption unit which delivers a dry $CO_2$ free stream of air at 5.6 bar and 12° C. Part of this air stream 45 is compressed to 70 bar in compressor 46, and the total air streams 48 and 47 enter a pumped liquid oxygen cycle air separation cryogenic system 49. The products from the air separator are a waste nitrogen stream 60 and a 30 bar product oxygen stream 50, which blends with a cooled portion of the $CO_2$ stream 63 leaving the direct contact air cooler 15 to produce the oxidant stream 51. This is compressed to 304 bar in the $CO_2/O_2$ compressor 52 driven by the electric motor 53, and the discharge stream 55 at 150 bar pressure is cooled to 20° C. in the water cooled heat exchanger 54 where it forms a high density supercritical fluid stream 56 having a composition of about 25% $O_2$ and about 75% $CO_2$ molar. This supercritical stream 56 is raised in pressure to 305 bar in a multistage pump 57. The resulting oxidant stream 58 is heated to 700° C. in heat exchanger 1 leaving as stream 8 to enter the combustor 2. The net $CO_2$ product stream 61, formed from combustion of the carbon present in the fuel gas feed stream 11, is removed as stream 61 from the cooled turbine exhaust stream 23.

In the foregoing cycle, a significant portion 31 of the total recycle high pressure $CO_2$ stream is heated using an additional heat source to the turbine exhaust stream in order to achieve low temperature difference at the hot end and cold end of the recuperator heat exchanger 1, which is the key to high efficiency for the cycle. In this case stream 31 is 37% of the total recycle high pressure $CO_2$ stream. The presently disclosed systems and methods, however, can beneficially reduce or eliminate the need for an externally provided heat source. Rather, according to embodiments of the present disclosure, it is possible to provide the necessary heating of a portion of the high pressure recycle $CO_2$ flow using the heat input derived directly from the adiabatic compression of a stream of high pressure recycle $CO_2$ which is bypassed around part of the recuperator heat exchanger 1, and specifying optimum flow and temperature combinations in the recuperator heat exchanger.

Figure 2:
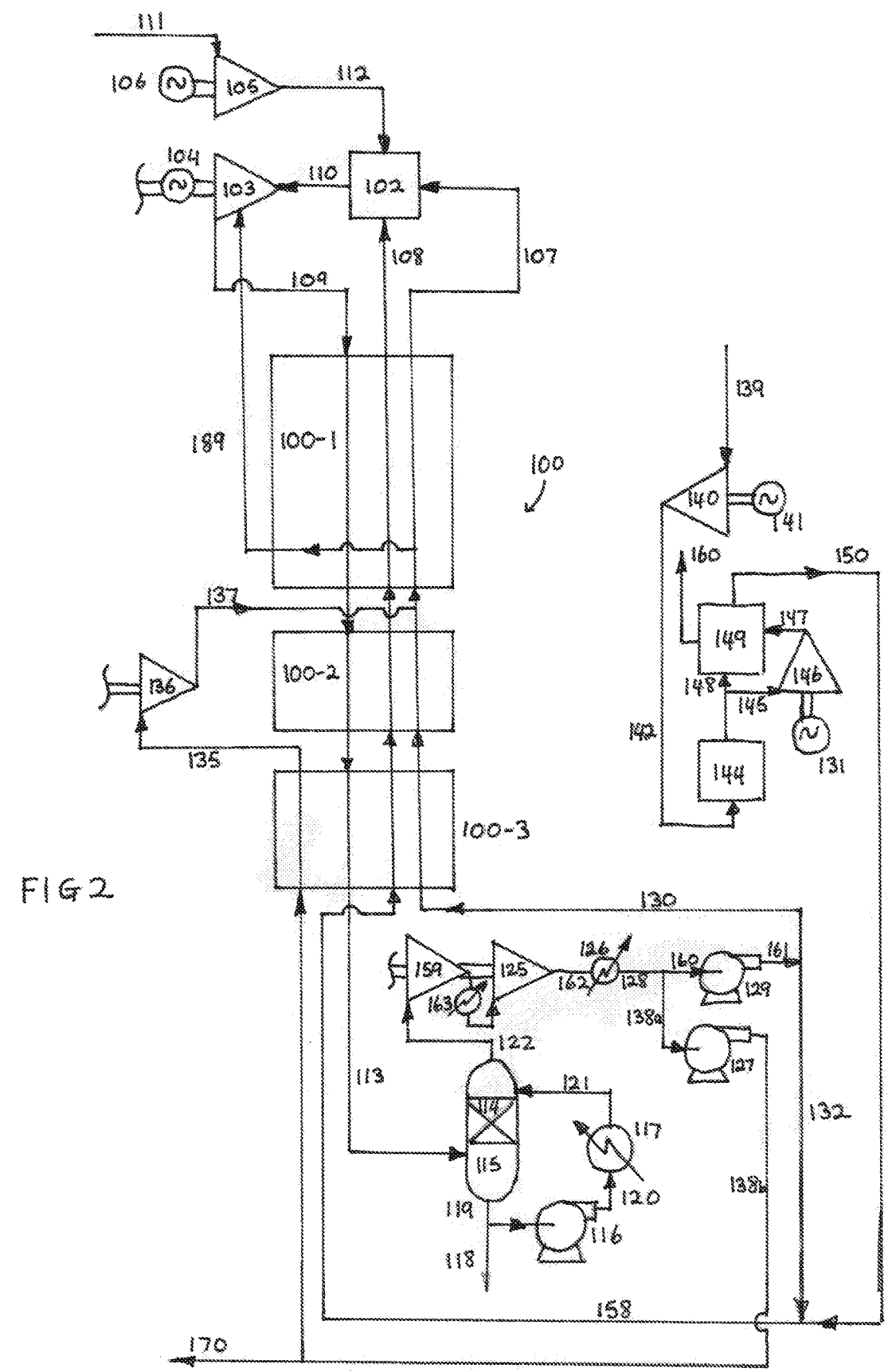
FIG. 2 is a flow diagram of a power cycle according to embodiments of the present disclosure wherein a portion of a recycle $CO_2$ stream bypasses at least one recuperative heating stage with a compression bypass.

Embodiments of a power cycle according to the present disclosure are illustrated in relation to FIG. 2. The illustrated cycle utilizes a cryogenic air separation plant producing an oxygen product stream 150 at a pressure of about 304 bar (e.g., at least 100 bar, at least 250 bar, or at least 300 bar, such as about 100 bar to about 500 bar, about 150 bar to about 450 bar, or about 200 bar to about 400 bar). The presently disclosed process can eliminate the requirement of a bypass high pressure recycle $CO_2$ heater (e.g., element 34 in FIG. 1) and a hot $CO_2$ compression stage (e.g., element 36 in FIG. 1), as well as the adiabatic compression stages. Moreover, the presently disclosed process can include a hot recycle $CO_2$ compressor 136 which compresses and heats part of the recycle high pressure $CO_2$ stream which bypasses a mid-section of the recuperator heat exchanger 100.

Referring more particularly to FIG. 2, a $CO_2$ stream 107 at about 304 bar (e.g., at least 100 bar, at least 250 bar, or at least 300 bar, such as about 100 bar to about 500 bar, about 150 bar to about 450 bar, or about 200 bar to about 400 bar) is heated to about 700° C. (e.g., at least 600° C., at least 625°

C., or at least 650° C., such as about 625° C. to about 900° C., about 650° C. to about 850° C., or about 675° C. to about 800° C.) in a multi stream heat exchanger 100 having a first section 100-1, a second section 100-2, and a third section 100-3 (although it is understood that a greater or lesser number of sections may be utilized in one or more embodiments). The $CO_2$ stream 107 enters a combustor 102 where it mixes with the combustion products arising from a methane stream 112 compressed to about 304 bar (e.g., at least 100 bar, at least 250 bar, or at least 300 bar, such as about 100 bar to about 500 bar, about 150 bar to about 450 bar, or about 200 bar to about 400 bar) and about 251° C. (e.g., at least 200° C., at least 215° C., or at least 225° C., such as about 215° C. to about 375° C., about 225° C. to about 325° C., or about 235° C. to about 300° C.) in compressor 105 driven by electric motor 106 burning in an oxidant stream 108 at a pressure of about 304 bar (e.g., at least 100 bar, at least 250 bar, or at least 300 bar, such as about 100 bar to about 500 bar, about 150 bar to about 450 bar, or about 200 bar to about 400 bar). The oxidant stream 108 comprises at least oxygen and preferably can comprise oxygen diluted with $CO_2$, such as having a molar composition of about 10% oxygen and about 90% $CO_2$ to about 40% oxygen and about 60% $CO_2$, preferably with an example composition of about 25% oxygen and about 75% $CO_2$ molar. The resulting mixed stream 110 enters the turbine 103 (driving a generator 104) at about 1150° C. (e.g., up to about 1600° C., up to about 1500° C., or up to about 1400° C., such as about 800° C. to about 1600° C., about 900° C. to about 1500° C., or about 1000° C. to about 1400° C.) and about 300 bar (e.g., at least 100 bar, at least 250 bar, or at least 300 bar, such as about 100 bar to about 500 bar, about 150 bar to about 450 bar, or about 200 bar to about 400 bar) and is expanded to about 30 bar (e.g., less than 65 bar, less than 60 bar, or less than 50 bar, such as about 1 bar to about 60 bar, about 15 bar to about 50 bar, or about 20 bar to about 40 bar) and about 720° C. (e.g., less than 850° C., less than 800° C., or less than 775° C., such as about 400° C. to about 1000° C., about 500° C. to about 900° C., or about 600° C. to about 800° C.) leaving as stream 109. In further embodiments, the inlet temperature for the turbine 103 can be up to the maximum operating temperature allowed for a turbine. In one or more embodiments, the turbine outlet pressure can be defined given a known turbine polytropic efficiency. The turbine can utilize a cooling high pressure $CO_2$ stream 189 which is extracted from the heating recycle high pressure $CO_2$ stream at an appropriate point in the heat exchanger 100.

The stream 109 cools in the heat exchanger 100 transferring heat to the high pressure $CO_2$ recycle stream 107 and leaves as stream 113 at a temperature of about 56° C. (e.g., less than 90° C., less than 80° C., or less than 70° C., such as about 30° C. to about 85° C., about 35° C. to about 80° C., or about 40° C. to about 70° C.). The stream 113 is further cooled in direct contact water cooler 115 which has a packed section 114 and a circulating water section comprising a pump 116 and an indirect water cooled heat exchanger 117 which directs water flows 119, 120 and 121 to the top of the packing section. The excess liquid water stream 118 produced in the $CH_4$ combustor is removed from the base of the packed tower 115. The cooled $CO_2$ stream 122 enters a two stage intercooled $CO_2$ compressor including a first compressor stage 159, a second compressor stage 125, and an intercooler 163 where it is compressed to about 65 bar (e.g., at least 40 bar, at least 45 bar, or at least 50 bar, such as about 45 bar to about 95 bar, about 50 bar to about 80 bar, or about 55 bar to about 70 bar). The total outlet stream 162 is cooled to about 20° C. (e.g., about 10° C. to about 30° C., about 12° C. to about 28° C., or about 15° C. to about 25° C.) in the water cooled heat exchanger 126. The density of the cooler outlet stream 128 is thus increased to about 0.8 kg/liter (e.g., about 0.5 kg/liter to about 1.5 kg/liter or about 0.6 kg/liter to about 1.2 kg/liter). The outlet $CO_2$ stream 128 splits into two streams. A bypass $CO_2$ flow 138a is removed at this point and enters the multistage pump 127 where its pressure is increased to about 110 bar (e.g., about 60 bar to about 200 bar, about 70 bar to about 190 bar, or about 80 bar to about 180 bar) and exits as bypass stream 138b. The remaining flow 160 enters a multistage pump 129 where its pressure is increased to about 304 bar (e.g., at least 100 bar, at least 250 bar, or at least 300 bar, such as about 100 bar to about 500 bar, about 150 bar to about 450 bar, or about 200 bar to about 400 bar). The discharge flow 161 splits into the main high pressure $CO_2$ recycle flow 130 which enters the recuperator heat exchanger 100 to be heated to about 700° C. (e.g., about 400° C. to about 1000° C., about 500° C. to about 900° C., or about 600° C. to about 800° C.), exiting as stream 107 to enter the combustor 102. The minor flow 132 is mixed with the oxygen stream 150 to form the oxidant stream 158. The product $CO_2$ stream from the carbon present in the hydrocarbon fuel stream 111 is removed under pressure as stream 170 taken from the bypass stream 138b leaving the bypass pump 127.

The oxygen required for the process is generated at a purity of about 99.5% molar or greater in a cryogenic air separation plant. A feed air stream 139 enters an intercooled multistage air compressor 140 driven by an electric motor 141. The discharge stream 142 at typically 5.7 bar pressure (e.g., at least 2 bar, at least 3 bar, or at least 4 bar, such as about 2 bar to about 15 bar, about 3 bar to about 12 bar, or about 4 bar to about 10 bar) enters an air cooling and purification unit 144 which includes a direct contact air cooler, a water-chiller and a switching dual bed thermally regenerated adsorption unit which delivers a dry, substantially $CO_2$ free stream of air at about 5.5 bar (e.g., about 2 bar to about 15 bar, about 3 bar to about 12 bar, or about 4 bar to about 10 bar) and 12° C. (e.g., about 1° C. to about 20° C., about 2° C. to about 18° C., or about 5° C. to about 15° C.). Part of this air stream 145 is compressed to 100 bar (e.g., about 30 bar to about 200 bar, about 50 bar to about 180 bar, or about 70 bar to about 150 bar) in compressor 146 driven by electric motor or other device 131, and the total air streams 148 and 147 enter a pumped liquid oxygen cycle air separation cryogenic system 149. The products from the air separator are a waste nitrogen stream 160 (which may be discharged to the atmosphere) and a product oxygen stream 150 at about 304 bar (e.g., at least 100 bar, at least 250 bar, or at least 300 bar, such as about 100 bar to about 500 bar, about 150 bar to about 450 bar, or about 200 bar to about 400 bar). This stream blends with a portion 132 of the high pressure $CO_2$ stream leaving the supercritical $CO_2$ pump 129 to form the oxidant stream 158. The oxidant stream 158 preferably comprises oxygen diluted with $CO_2$, such as having a molar composition of about 10% oxygen and about 90% $CO_2$ to about 40% oxygen and about 60% $CO_2$, preferably with an example composition of about 25% $O_2$ plus about 75% $CO_2$ molar. The oxidant stream is heated to about 700° C. (e.g., about 400° C. to about 1000° C., about 500° C. to about 900° C., or about 600° C. to about 800° C.) in the recuperator heat exchanger 100 leaving as stream 108 which enters the combustor 102. Note that the combustor will typically be incorporated within the turbine 103.

The turbine exhaust stream contains water vapor derived in this case from the combustion of the hydrogen fraction of the pure methane fuel. This results in an $H_2O$ content of about 6.0% molar in the turbine exhaust stream (e.g., about 2.0% to about 10.0%, about 3.0% to about 9.0%, or about 4.0% to about 8.0% molar). The dew-point of this stream is about 111° C.

For clarity in defining the optimum design of the recuperator heat exchanger 100 it is convenient to break it into three sections. The first and hottest section 100-1 cools the turbine exhaust 109 from an inlet temperature of 720° C. to a temperature of about 212° C. (e.g., about 150° C. to about 300° C., about 170° C. to about 275° C., or about 190° C. to about 250° C.) at which point the specific heat of the high pressure recycle $CO_2$ stream at about 303 bar has increased relative to the 30 bar turbine exhaust stream so that the temperature difference has been reduced to about 6° C. (e.g., about 2° C. to about 20° C., about 3° C. to about 15° C., or about 4° C. to about 12° C.). The middle section 100-2 must maintain a positive minimum temperature difference by significantly reducing the recycle high pressure $CO_2$ flow being heated in this section. This is accomplished by bypassing a defined amount (e.g., about 20% to about 50%, about 25% to about 45%, or about 30% to about 40%, such as about 36.5%) of the total recycle high pressure $CO_2$ flow stream 135 around section 100-2 and heating the bypass stream from a temperature of about 110° C. up to a temperature of about 206° C. (e.g., about 150° C. to about 250° C., about 160° C. to about 240° C., or about 180° C. to about 220° C.) before it re-enters the recuperator heat exchanger as an inlet stream 137 at the colder end of section 100-1 where stream 137 rejoins the main high pressure recycle $CO_2$ flow at a corresponding temperature. The bypass stream 138b is heated to about 110° C. (e.g., about 80° C. to about 140° C., about 90° C. to about 130° C., or about 100° C. to about 120° C.) in the recuperator section 100-3 leaving as stream 135. It is compressed from 110 bar to 304 bar (e.g., at least 100 bar, at least 250 bar, or at least 300 bar, such as about 100 bar to about 500 bar, about 150 bar to about 450 bar, or about 200 bar to about 400 bar) in the adiabatic compression stage 136 leaving as stream 137, which enters the recuperator heat exchanger between sections 100-1 and 100-2 where it rejoins the main recycle high pressure $CO_2$ stream. The use of a bypass $CO_2$ recycle compression stage has the dual function of raising the pressure of the bypass portion of the recycle $CO_2$ stream plus raising its temperature to the same value as the recycle $CO_2$ leaving the hot end of the recuperator heat exchanger section 100-2. The adiabatic compression stage 136 can be incorporated into a multi stage integrally geared turbo compressor including stages 159 and 125 of the recycle $CO_2$ compressor, which can either be directly coupled to the turbine or separately driven using an electric motor.

Figure 3:
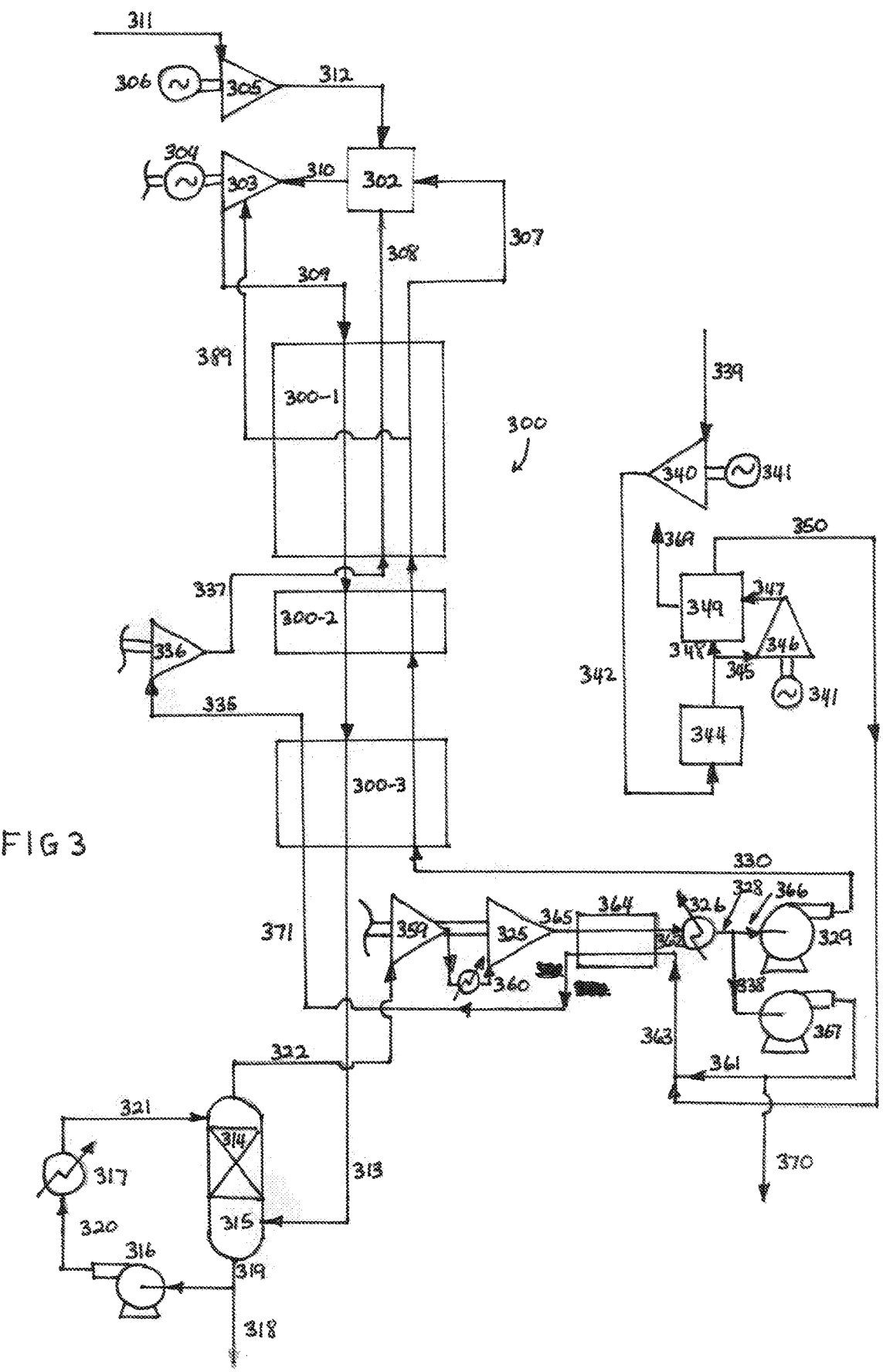
FIG. 3 is a flow diagram of a power cycle according to further embodiments of the present disclosure wherein a portion of a recycle $CO_2$ stream bypasses at least one recuperative heating stage with a compression bypass.

Other process variations are possible within the context of the use of bypass compression to achieve the necessary optimum performance of the power cycle without the need for externally supplied low temperature heating of the high pressure recycle $CO_2$ stream. Further embodiments of the present process configuration are illustrated in FIG. 3. In embodiments according to FIG. 3, a cryogenic air separation plant produces an oxygen product stream 350 at a pressure that is substantially similar to the discharge pressure of a bypass compressor pump 367. The oxygen product stream 350 has an oxygen purity of greater than 99% and preferably greater than 99.5% (molar). The illustrated process preferably provides for elimination of external heat inputs provided by indirect heat exchange to the high pressure recycle $CO_2$ provided by the cooled adiabatic compression stages of the air compressors used for the cryogenic air separation unit and the hot $CO_2$ compressor. The bypass high pressure recycle $CO_2$ heater can also be eliminated. The necessary heat input to the high pressure recycle $CO_2$ stream to maximize overall power plant efficiency can be provided by the adiabatic compression of a stream of oxidant in an adiabatic compressor stage 336 which bypasses section 300-2 of the recuperative heat exchanger 300. This adiabatic bypass compressor stage 336 compresses and heats part of the recycle high pressure $CO_2$ stream which bypasses the mid-section or second section 300-2 of the recuperator heat exchanger 300. This stream also includes the entire pure oxygen stream required for combustion of the fuel in the oxy-fuel combustor. Variation in the recuperator hot end temperature difference and the ambient cooling means such as the available cooling water temperature will vary the required inlet and outlet temperatures of the recycle compressor and the $CO_2$ pumps. The optimum operating conditions in the recuperator heat exchanger are fixed by the turbine inlet temperature and pressure, the turbine outlet pressure and the temperature differences specified in the recuperative heat exchanger. Since the discharge pressure of the bypass compressor is generally fixed by the required turbine inlet pressure, the variable becomes the bypass compressor inlet pressure which is controlled by the dew point of the turbine discharge flow and therefore by the composition of the fuel gas used in stream 311 and which defines the inlet temperature and temperature rise in the bypass compression stage. Fixing the bypass compressor discharge pressure and temperature and the inlet temperature defines the required bypass compressor inlet pressure. Coal derived fuel gas from a gasification process will contain a high concentration of hydrogen which will increase the dew point of the turbine exhaust and raise the inlet pressure of the bypass compressor.

The bypass compressor inlet temperature can be defined by the dew point of the turbine exhaust stream and the specification of the temperature difference between the cooling turbine exhaust stream and the temperature of the high pressure heating streams at the interface between sections 300-2 and 300-3 of the recuperator heat exchanger. The cooling turbine exhaust stream leaving section 300-2 and entering section 300-3 of the recuperator heat exchanger will in general be at its dew point, and this defines the interface temperature between sections 300-2 and 300-3 of the recuperator heat exchanger. The $CO_2$ for the bypass compressor stream 338 is taken from the high density supercritical $CO_2$ stream leaving the recycle $CO_2$ compressor after-cooler 326. This allows the bypass $CO_2$ stream at high density to be compressed to the required inlet pressure for the bypass compressor using a multi-stage pump with low power requirement. The operation of the power cycle at the highest possible efficiency requires a low temperature difference at the cold turbine exhaust stream 313 leaving section 300-3 of the recuperator heat exchanger and the temperatures of the recycle high pressure $CO_2$ stream 330 and the bypass oxidant stream 371 entering section 300-3 of the recuperative heat exchanger. This can be achieved by adjusting the temperature of the bypass $CO_2$ stream entering section 300-3. To accomplish this it can be beneficial to include a heater 364 for the bypass $CO_2$ stream between the mixed oxidant bypass flow 363 and the inlet to section 300-3 of the recuperator heat exchanger stream 371. This heater can utilize heat of compression from the recycle compressor train (elements 359, 360, and 325 in FIG. 3). It should be noted that the mixing of the required oxygen stream 350 into the heated bypass $CO_2$ stream 371 will cause the temperature to fall since the partial pressure of oxygen in the mixture will be far lower than the pressure of stream 350 before mixing. This cooling can best be utilized to reduce power consumption be mixing the oxygen stream 350 with the stream 361 leaving the pump 367 and then using this stream 363 to pre-cool the inlet stream 366 to pump 329. Alternatively part of the cooling water can be further cooled and used in the direct contact water cooler circulating heat exchanger to further reduce the temperature of the recycle compressor stream 322. The entire oxygen stream required for fuel gas combustion produced from the cryogenic air separation plant at the bypass compressor inlet pressure is mixed with the bypass compressor $CO_2$ flow either before or after the bypass $CO_2$ heater. This results in the bypass compressor discharge stream becoming the oxidant stream for fuel combustion with a separate pass in section 300-1 of the recuperator heat exchanger 300. The oxygen is generally between 10% and 20% molar concentration in the oxidant stream. A detailed flow-sheet for the process is shown in FIG. 3.

A $CO_2$ stream 307 at about 304 bar (e.g., at least 100 bar, at least 250 bar, or at least 300 bar, such as about 100 bar to about 500 bar, about 150 bar to about 450 bar, or about 200 bar to about 400 bar) is heated to about 695° C. (e.g., at least 600° C., at least 625° C., or at least 650° C., such as about 625° C. to about 900° C., about 650° C. to about 850° C., or about 675° C. to about 800° C.) in multi stream heat exchanger 300. The $CO_2$ stream 307 enters a combustor 302 where it mixes with the combustion products derived from a methane stream 312 compressed to about 304 bar (e.g., at least 100 bar, at least 250 bar, or at least 300 bar, such as about 100 bar to about 500 bar, about 150 bar to about 450 bar, or about 200 bar to about 400 bar) and about 251° C. (e.g., at least 200° C., at least 215° C., or at least 225° C., such as about 215° C. to about 375° C., about 225° C. to about 325° C., or about 235° C. to about 300° C.) in compressor 305 driven by electric motor 306 burning in an oxidant stream 308 which has a composition of about 14% oxygen molar and a pressure of about 303 bar (e.g., at least 100 bar, at least 250 bar, or at least 300 bar, such as about 100 bar to about 500 bar, about 150 bar to about 450 bar, or about 200 bar to about 400 bar). The oxidant stream 308, for example, can comprise oxygen diluted with $CO_2$, such as having a molar composition of about 10% oxygen and about 90% $CO_2$ to about 40% oxygen and about 60% $CO_2$, preferably with an example composition of about 25% oxygen and about 75% $CO_2$ molar.

The resulting mixed stream 310 enters the turbine 303, which drives an electric generator 304, the mixed stream being at about 1212° C. (e.g., up to about 1600° C., up to about 1500° C., or up to about 1400° C., such as about 800° C. to about 1600° C., about 900° C. to about 1500° C., or about 1000° C. to about 1400° C.) and about 300 bar (e.g., at least 100 bar, at least 250 bar, or at least 300 bar, such as about 100 bar to about 500 bar, about 150 bar to about 450 bar, or about 200 bar to about 400 bar), and is expanded to about 20 bar (e.g., less than 65 bar, less than 60 bar, or less than 50 bar, such as about 1 bar to about 60 bar, about 10 bar to about 50 bar, or about 15 bar to about 40 bar) and about 720° C. (e.g., less than 850° C., less than 800° C., or less than 775° C., such as about 400° C. to about 1000° C., about 500° C. to about 900° C., or about 600° C. to about 800° C.) leaving as stream 309. In further embodiments, the inlet temperature for the turbine 303 can be up to the maximum operating temperature allowed for a turbine. In one or more embodiments, the turbine outlet pressure can be defined given a known turbine polytropic efficiency. The combustor 302 can be incorporated within the framework of the turbine 303 or it can be a separate unit. The turbine can utilize a cooling high pressure $CO_2$ stream 389 which is extracted from the heating recycle high pressure $CO_2$ stream at an appropriate point in the heat exchanger 300.

The 20 bar stream cools in the heat exchanger 300, transferring heat to the high pressure $CO_2$ recycle stream 307 and the oxidant stream 308 and leaves at about 74° C. (e.g., less than 100° C., less than 90° C., or less than 80° C., such as about 30° C. to about 95° C., about 35° C. to about 90° C., or about 40° C. to about 85° C.) in stream 313. It is further cooled in direct contact water cooler 315 which has a packed section 314 and a circulating water section comprising a pump 316 and an indirect water cooled heat exchanger 317 using cooling water available at 25° C. The water stream 319, 320 and 321 flows to the top of the packing section. The excess liquid water produced in the combustor 302, stream 318, is removed from the base of the packed tower 315.

The cooled $CO_2$ stream 322 enters a two stage intercooled $CO_2$ compressor including a first stage compressor 359, a second stage compressor 325, and an intercooler 360 where it is compressed to about 65 bar (e.g., at least 40 bar, at least 45 bar, or at least 50 bar, such as about 45 bar to about 95 bar, about 50 bar to about 80 bar, or about 55 bar to about 70 bar). The stream of recycle $CO_2$ 365 leaving the final stage 325 is cooled in heat exchanger 364 from a temperature of about 71° C. to a temperature of about 31° C. (e.g., about 25° C. to about 50° C.) to provide stream 362, which then passes through water cooled heat exchanger 326 resulting in a recycle $CO_2$ stream 328 at a temperature of about 17° C. (e.g., about 10° C. to about 30° C., about 12° C. to about 28° C., or about 15° C. to about 25° C.). The outlet $CO_2$ stream 328 has now increased in density to about 0.82 kg/liter (e.g., about 0.5 kg/liter to about 1.5 kg/liter or about 0.6 kg/liter to about 1.2 kg/liter). The stream 328 now divides into two steams. The main recycle $CO_2$ flow 366 is raised in pressure to about 304 bar (e.g., at least 100 bar, at least 250 bar, or at least 300 bar, such as about 100 bar to about 500 bar, about 150 bar to about 450 bar, or about 200 bar to about 400 bar) and about 52° C. (e.g., about 35° C. to about 80° C. or about 40° C. to about 60° C.) in the multistage pump 329. The bypass compressor $CO_2$ stream 338 is raised in pressure to about 110 bar (e.g., about 60 bar to about 200 bar, about 70 bar to about 190 bar, or about 80 bar to about 180 bar) and about 25° C. (e.g., about 20° C. to about 30° C.) in the multistage pump 367. The main recycle $CO_2$ stream 330 then enters the recuperator heat exchanger 300 where it is heated to about 700° C. (e.g., about 400° C. to about 1000° C., about 500° C. to about 900° C., or about 600° C. to about 800° C.) leaving as stream 307.

The substantially pure oxygen stream 350 (e.g., about 99.5% $O_2$ purity molar) at about 111 bar (e.g., about 80 bar to about 140 bar, about 90 bar to about 130 bar, or about 100 bar to about 120 bar) and about 19° C. (e.g., about 10° C. to about 30° C., about 12° C. to about 28° C., or about 15° C. to about 25° C.) is mixed with the bypass stream 361 leaving the pump 367 to produce the oxidant bypass stream 363 at a temperature of about 13° C. (e.g., about 8° C. to about 20° C.). The bypass oxidant $CO_2$ stream, which is at the pressure require for the inlet to the bypass compressor, is heated to a temperature of about 66° C. (e.g., about 40° C. to about 90° C. or about 50° C. to about 80° C.) in heat exchanger 364 leaving as stream 371 and entering section 300-3 of the recuperative heat exchanger. The net $CO_2$ product stream 370 is taken from the stream 361 at about 110 bar (e.g., about 80 bar to about 140 bar, about 90 bar to about 130 bar, or about 100 bar to about 120 bar) before the mixing point with the oxygen stream 350.

The air separation plant has a feed air stream 339 which enters an intercooled multistage air compressor 340 driven by an electric motor 341. The discharge stream 342 at typically about 5.7 bar pressure (e.g., at least 2 bar, at least 3 bar, or at least 4 bar, such as about 2 bar to about 15 bar, about 3 bar to about 12 bar, or about 4 bar to about 10 bar) enters an air cooling and purification unit 344 which includes a direct contact air cooler, a water-chiller, and a switching duel bed thermally regenerated adsorption unit which delivers a dry, substantially $CO_2$ free stream of air at about 5.5 bar (e.g., about 2 bar to about 15 bar, about 3 bar to about 12 bar, or about 4 bar to about 10 bar) and 12° C. (e.g., about 1° C. to about 20° C., about 2° C. to about 18° C., or about 5° C. to about 15° C.). Part of this air stream 345 is compressed to about 86 bar (e.g., about 30 bar to about 180 bar, about 50 bar to about 150 bar, or about 60 bar to about 120 bar in compressor 346 also driven by the electric motor 341, and the total air streams 348 and 347 enter a pumped liquid oxygen cycle air separation cryogenic system 349. The products from the air separator are a waste nitrogen stream 369 and a 111 bar product oxygen stream 350. The oxidant stream 363 contains, for example, about 17.8% molar $O_2$. In some embodiments, the oxidant stream 363 can comprise a molar composition of about 10% oxygen and about 90% $CO_2$ to about 40% oxygen and about 60% $CO_2$, preferably with an example composition of about 15% $O_2$ and about 85% $CO_2$ to about 25% $O_2$ and about 75% $CO_2$ molar. The turbine exhaust stream contains water vapor derived in this case from the combustion of the hydrogen fraction of the pure methane fuel. This results in an $H_2O$ content of 6.5% molar in the turbine exhaust stream (e.g., about 2.0% to about 10.0%, about 3.0% to about 9.0%, or about 4.0% to about 8.0% molar). The dew-point of this stream is about 108° C.

For clarity in defining the optimum design of the recuperator heat exchanger it is convenient to break it into three sections. The first and hottest section 300-1 cools the turbine exhaust from an inlet temperature of about 720° C. to a temperature of about 214° C. (e.g., about 150° C. to about 300° C., about 170° C. to about 275° C., or about 190° C. to about 250° C.) at which point the specific heat of the high pressure recycle $CO_2$ stream at about 304 bar has increased relative to the 30 bar turbine exhaust stream so that the temperature difference has been reduced to about 5° C. (e.g., about 2° C. to about 20° C., about 3° C. to about 15° C., or about 4° C. to about 12° C.). The middle section 300-2 must maintain a positive minimum temperature difference by significantly reducing the recycle high pressure $CO_2$ flow being heated in this section. This is accomplished by bypassing stream 335 comprising the total oxygen plus balancing $CO_2$ flow around section 300-2 of the recuperative heat exchanger. The section 300-2, in an example embodiment, has a flow of 64.9% of the total high pressure recycle $CO_2$ to provide the required positive temperature difference. In further embodiments, the section 300-2 can have a flow of about 50% to about 80%, about 55% to about 75%, or about 60% to about 70% of the total high pressure recycle $CO_2$. The bypass oxidant stream is heated to about 103° C. (e.g., about 80° C. to about 140° C., about 90° C. to about 130° C., or about 100° C. to about 120° C.) in the recuperator heat exchanger section 300-3 leaving as stream 335. It is compressed from about 109.5 bar to about 304 bar (e.g., at least 100 bar, at least 250 bar, or at least 300 bar, such as about 100 bar to about 500 bar, about 150 bar to about 450 bar, or about 200 bar to about 400 bar) in the adiabatic compression stage 336 leaving as stream 337 at about 303 bar and about 209° C., which enters the recuperator heat exchanger between sections 300-1 and 300-2 where it becomes a separately heated stream leaving the recuperator hot end as the oxidant stream 308. The use of a bypass $CO_2$ oxidant recycle compression stage has the duel function of raising the pressure of the bypass portion of the recycle oxidant $CO_2$ stream plus raising its temperature to the same value as the recycle $CO_2$ leaving the hot end of the recuperator heat exchanger section 300-2.

As can be seen from the foregoing, the present disclosure can provide systems and methods whereby power production can be achieved with improved efficiency, preferably without the need to utilize heating from an external source. Rather the present systems and methods can be configured to allow for extra heating of a recycle $CO_2$ stream and/or a combined oxygen and recycle $CO_2$ stream through use of a bypass compressor.

In one or more embodiments, a method of power production incorporating processing steps as exemplified above can comprise combusting fuel (112, 312) from a fuel source (111, 311) with oxidant stream (108, 308) in a combustor (102, 302) in the presence of a recycle $CO_2$ stream (107, 307) at a suitably increased pressure, such as a pressure of at least 100 bar, at least 250 bar, or at least 300 bar, or more particularly such as a pressure of about 100 bar to about 500 bar, about 150 bar to about 450 bar, or about 200 bar to about 400 bar, in order to form a combustion stream (110, 310). The combustion stream (110, 310) can be at a suitably high temperature, such as up to about 1600° C., up to about 1500° C., or up to about 1400° C., or more particularly such as about 700° C. to about 1600° C., about 800° C. to about 1600° C., about 900° C. to about 1500° C., or about 1000° C. to about 1400° C.

The combustion stream (110, 310) can be expanded to a lower pressure in a turbine (103, 303) to produce power using an electric generator (104, 304) and form a turbine exhaust stream (109, 309). In example embodiments, the turbine exhaust stream (109, 309) can be at a pressure of less than 65 bar, less than 60 bar, or less than 50 bar, such as about 1 bar to about 60 bar, about 1 bar to about 50 bar, about 10 bar to about 50 bar, or about 15 bar to about 40 bar. Likewise, the turbine exhaust stream (109, 309) can be at a temperature that is less than 850° C., less than 800° C., or less than 775° C., such as about 400° C. to about 1000° C., about 500° C. to about 900° C., or about 600° C. to about 800° C.

The turbine exhaust stream (109, 309) can be cooled in a recuperative heat exchanger (100, 300) having a plurality of sections operating at different temperature ranges. As illustrated in FIG. 2 and FIG. 3, the heat exchanger (100, 300) has three section, which can be described as a first heat exchanger section (100-1, 300-1), a second heat exchanger section (100-2, 300-2), and a third heat exchanger section or last heat exchanger section (100-3, 300-3). The use of the term "last heat exchanger section" indicates that more than three heat exchanger sections may be used. As illustrated, the third heat exchanger section (100-3, 300-3) is operated as a last heat exchanger section when one or more additional heat exchanger section(s) are included between the first heat exchanger section (100-1, 300-1) and the second heat exchanger section (100-2, 300-2) and/or between the second heat exchanger section (100-2, 300-2) and the last heat exchanger section (100-3, 300-3). The plurality of heat exchanger sections are adapted to or configured to operate at substantially different temperature ranges, it being understood that the temperature ranges may overlap. In this manner, the turbine exhaust stream (109, 309) can be successively cooled during passage through the plurality of sections of the heat exchanger. Likewise, as further described below, further streams can be successively reheated by passage through one or more of the sections of the heat exchanger (100, 300).

Cooled turbine exhaust stream (113, 313) exiting the last section (100-3, 300-3) of the heat exchanger can be purified to form a substantially pure $CO_2$ stream (122, 322). The purification can specifically include removal of water from the turbine exhaust stream using, for example, a direct contact water cooler (115, 315) and associated components as already described above. In this manner, water formed during combustion of the hydrocarbon fuel (112, 312) can be removed along with other contaminants that may be present, and it is understood that further purification components can be included as needed to achieve such purification.

The substantially pure $CO_2$ stream (122, 322) can be separated into a first portion (160, 366) and a second portion (138a, 338). As described above, prior to such separation into the separate portions, the substantially pure $CO_2$ stream (122, 322) can be compressed using a multi-stage compressor (159/125, 359/325) that is intercooled using a cooler. For example, the substantially pure $CO_2$ stream can be compressed in the multi-stage compressor to a pressure of about 65 bar to about 90 bar.

The first portion of the substantially pure $CO_2$ stream can be pumped to an increased pressure using a first pump (129, 329), and the second portion of the substantially pure $CO_2$ stream can be pumped to an increased pressure using a second pump (127, 367). The first pump and second pump can be configured to operate at substantially different pressure ranges, and such ranges may overlap. For example, the first pump (129, 329) can be configured to pump the first portion of the substantially pure $CO_2$ stream to a pressure suitable for input to the combustor (as already described above). The second pump (127, 367) may be configured to pump the second portion of the substantially pure $CO_2$ stream to a substantially lower pressure so that the second portion of the substantially pure $CO_2$ stream can be utilized as a bypass stream (135/137, 335/337). As such, the second pump (127, 367) may be configured to pump the second portion of the substantially pure $CO_2$ stream to a pressure of about 60 bar to about 200 bar, about 70 bar to about 190 bar, about 80 bar to about 180 bar or about 80 bar to about 140 bar.

The first portion and the second portion of the substantially pure $CO_2$ stream can be passed back through the heat exchanger to increase their respective temperatures. As noted above, the first portion of the substantially pure $CO_2$ stream can be at a pressure suitable for input to the combustor and, as such, the first portion may be utilized as a recycle $CO_2$ stream. In particular, after heating in the heat exchanger, the first portion may be considered to be the recycle $CO_2$ stream (107, 307). Accordingly, the method can include passing the first portion of the substantially pure $CO_2$ stream to the combustor as the recycle $CO_2$ stream.

The second portion of the substantially pure $CO_2$ stream likewise may be ultimately passed back into the combustor; however, the second portion preferably is utilized as a bypass stream to provide additional heating to one or more streams that are being reheated in the recuperative heat exchanger.

In one or more embodiments, the second portion of the substantially pure $CO_2$ stream thus can bypass at least one section of the plurality of sections of the heat exchanger. This can be achieved, for example, by carrying out the following: withdrawing the second portion of the substantially pure $CO_2$ stream upstream from the at least one section of the plurality of sections of the heat exchanger; processing the second portion of the substantially pure $CO_2$ stream in a compressor so as to increase a pressure and a temperature of the second portion of the substantially pure $CO_2$ stream and thus form a bypass portion of the substantially pure $CO_2$ stream; and entering the bypass portion of the substantially pure $CO_2$ stream into the heat exchanger downstream from the at least one section of the plurality of sections of the heat exchanger. Referring to the example embodiments in FIG. 1 and FIG. 3, the bypass can comprise bypassing the second heat exchanger section (100-2, 300-2). More specifically, this can comprise withdrawing the second portion stream in line 135, 335 exiting an outlet at a hot end of the last heat exchanger section (100-3, 300-3) so as to be upstream (relative to the flow direction of the second portion stream) from the second heat exchanger section. The second portion of the substantially pure $CO_2$ stream in line 135, 335 can be processed in a compressor (136, 336), which can be an adiabatic compressor, so as to increase a pressure and a temperature of the second portion of the substantially pure $CO_2$ stream. This thus forms bypass portion (137, 337) of the substantially pure $CO_2$ stream exiting the bypass compressor (136, 336). The bypass portion (137, 337) is then input back into the heat exchanger downstream from the second heat exchanger section (100-2, 300-2). For example, the bypass portion may be input directly into the first heat exchanger section (100-1, 300-1). Alternatively, the bypass portion may be input to reheating stream that is passing through the heat exchanger (100, 300) downstream from the second heat exchanger section (or other heat exchanger section that is being bypassed). This thus provides additional heating to the reheating streams to improve process efficiency. The bypass compressor preferably is configured to compress the second portion (i.e., the bypass portion) of the substantially pure $CO_2$ stream to a pressure suitable for input into the combustor, such as a range as already described above.

In the example embodiment illustrated in FIG. 2, the bypass portion 137 of the substantially pure $CO_2$ stream enters into the heat exchanger 100 by being combined with the first portion of the substantially pure $CO_2$ stream (passing as stream 130) downstream from the second heat exchanger section 100-2 relative to the flow of the first portion through the heat exchanger. Stream 130 as illustrated is the first portion of the substantially pure $CO_2$ stream that remains after a third portion of the substantially pure $CO_2$ stream is separated off in stream 132. The third portion of the substantially pure $CO_2$ stream can be combined with an oxygen stream to form the oxidant stream (158 and 108) that is passed to the combustor, and this so-formed oxidant stream can have oxygen/$CO_2$ ratios as already described above.

In the example embodiment illustrated in FIG. 3, the second portion of the substantially pure $CO_2$ stream can be combined with an oxygen stream before the second portion of the substantially pure $CO_2$ stream bypasses the at least one section of the plurality of sections of the heat exchanger. In this manner, the bypass portion of the substantially pure $CO_2$ stream can exit the heat exchanger as the oxidant stream. As illustrated in FIG. 3, the second portion 338 exits the pump 367 as stream 361 and mixes with oxygen stream 350 to form stream 363, which can be heated to form stream 371, which enters the last heat exchanger section 300-3. Preferably, after the second portion of the substantially pure $CO_2$ stream is combined with the oxygen stream but before the second portion of the substantially pure $CO_2$ stream is passed through the heat exchanger, the second portion of the substantially pure $CO_2$ stream including the combined oxygen stream is heated in the heat exchanger 364.

The quantity of the second portion of the substantially pure $CO_2$ stream that bypasses the at least one section of the plurality of sections of the heat exchanger can be configured to provide a desired minimum temperature difference in the bypassed section of the heat exchanger. For example, the quantity of the second portion of the substantially pure $CO_2$ stream that bypasses the at least one section can be sufficient to give a positive minimum temperature difference in the bypassed section of about 2° C. to about 20° C.

In some embodiments, the temperatures of the stream (135, 335) entering the bypass compressor (136, 336) and the stream (137, 337) exiting the bypass compressor can be provided in defined ranges configured to provide a desired minimum temperature difference in the bypassed section of the heat exchanger. For example, the temperatures can be configured to provide a positive minimum temperature difference in the bypassed section of the heat exchanger of about 2° C. to about 20° C.

The inlet pressure of the bypass compressor likewise may be controlled to provide desired performance. For example, the compressor processing the second portion of the substantially pure $CO_2$ stream (i.e., the bypass compressor) can have an inlet pressure of about 65 bar to about 260 bar.

In one or more embodiments, the present disclosure specifically provides for power production systems utilizing a combination of components as already described herein. In an example embodiment, a power production system can comprise: a combustor configured to receive a plurality of streams and having an outlet; a turbine having an inlet in fluid connection with the outlet of the combustor and having an outlet; a generator configured for production of electrical power and in a power-generating connection with the turbine; a heat exchanger comprising a first section, a second section, and a last section each section having a plurality of inlets and outlets, each section being configured for operation at different temperature ranges, wherein the first section has an inlet and an outlet in fluid connection with the turbine; a separator in fluid connection with an outlet from the last section of the heat exchanger and having an outlet for output of a substantially pure $CO_2$ stream; a divider configured for dividing the substantially pure $CO_2$ stream into a first portion and a second portion; a first pump configured to receive the first portion of the substantially pure $CO_2$ stream and increase a pressure thereof, the first pump having an outlet in fluid connection with a first inlet of the last section of the heat exchanger; a second pump configured to receive the second portion of the substantially pure $CO_2$ stream and increase a pressure thereof, the second pump having an outlet in fluid connection with a second inlet of the last section of the heat exchanger; and a bypass compressor having an inlet in fluid connection with an outlet of the last section of the heat exchanger, the inlet being configured to receive the second portion of the substantially pure $CO_2$ stream, and having an outlet in fluid connection with an inlet on the first section of the heat exchanger, such that the second portion of the substantially pure $CO_2$ stream is configured to bypass the second section of the heat exchanger.

Of course, the foregoing should not be construed as being limiting of the combination of components that may be utilized in forming a power producing system according to the present disclosure. Preferably, a power producing system according to the present disclosure includes, at a minimum, a bypass compressor that is adapted to or configured to increase a temperature and a pressure of a reheating stream that is withdrawn from a recuperative heat exchanger and is reinserted into the heat exchanger after bypassing at least one section thereof. As such, the power producing system preferably also includes a recuperative heat exchanger, a power producing turbine (and associated generator) and any further compressors, pumps, heat exchangers, transfer lines, combustor(s) and the like that may be useful in carrying a power producing method as otherwise described herein.

Exemplary embodiments of the present disclosure illustrating process efficiency are shown below.

Example 1 (Embodiment According to FIG. 3)

| | |
|---|---|
| Turbine inlet condition | 1212° C. and 300 bar |
| Turbine cooling and seal gas flow | 10% of turbine outlet flow |
| Turbine outlet condition | 720° C. and 20 bar |
| Oxygen flow rate | 4120.9 metric tons per day |
| Turbine power | 492.7 Mw |
| Parasitic power for $O_2$ plus $CH_4$ and $CO_2$ compression | 143.79 Mw |
| Net power output | 348.97 Mw |
| Methane fuel power potential | 595 Mw |
| Recycle $CO_2$ at 304 bar entering recuperator Hx | 3,098,320 Kg/Hr |
| Net efficiency | 58.65% (LHV) |

Example 2 (Embodiment According to FIG. 2)

| | |
|---|---|
| Turbine inlet condition | 1520° C. and 300 bar |
| Turbine cooling and seal gas flow | 10% of turbine outlet flow |
| Turbine outlet condition | 707° C. and 4 bar |
| Turbine power | 904.4 Mw |
| Parasitic power for $O_2$ plus $CH_4$ and $CO_2$ compression | 255.1 Mw |
| Net power output | 649.3 Mw |
| Methane fuel power potential | 927.21 Mw |
| Recycle $CO_2$ at 304 bar entering recuperator Hx | 3,131,657 Kg/Hr |
| Net efficiency | 70.0% (LHV) |

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method of increasing available heat in a recycled stream in a power production system, the method comprising:
  expanding a combustion stream from a higher pressure to a lower pressure in a turbine to produce power and form a turbine exhaust stream;
  cooling the turbine exhaust stream in a heat exchanger operating over a range of different temperatures to form a cooled turbine exhaust stream;
  processing the cooled turbine exhaust stream to provide a recycled stream comprising $CO_2$ that is available as a first portion and a second portion;

pumping the first portion of the recycled stream comprising $CO_2$ and the second portion of the recycled stream comprising $CO_2$ to an increased pressure;

passing the first portion of the recycled stream comprising $CO_2$ through the heat exchanger to increase a temperature thereof;

processing the second portion of the recycled stream comprising $CO_2$ in a compressor so as to increase a pressure and a temperature of the second portion of the recycled stream comprising $CO_2$ and thus form a bypass portion of the recycled stream comprising $CO_2$;

passing the first portion of the recycled stream comprising $CO_2$ to a combustor; and passing the bypass portion of the recycled stream comprising $CO_2$ to the combustor so that the bypass portion of the recycled stream comprising $CO_2$ bypasses at least a portion of the heat exchanger.

2. The method of claim 1, wherein the recycled stream comprising $CO_2$ taken from the cooled turbine exhaust stream is processed through a multi-stage compressor.

3. The method of claim 1, wherein the heat exchanger operating over a range of different temperatures comprises a plurality of sections.

4. The method of claim 3, wherein the heat exchanger operating over a range of different temperatures comprises at least a first section, a second section, and a third section.

5. The method of claim 4, wherein the bypass portion of the recycled stream comprising $CO_2$ bypasses the second section of the heat exchanger and is heated in the first section and the third section of the heat exchanger.

6. The method of claim 3, wherein the bypass portion of the recycled stream comprising $CO_2$ bypasses at least one section of the plurality of sections of the heat exchanger and is heated in at least one of the plurality of sections of the heat exchanger.

7. The method of claim 3, wherein the plurality of sections of the heat exchanger are a plurality of separate heat exchangers.

8. The method of claim 1, wherein the bypass portion of the recycled stream comprising $CO_2$ bypasses a portion of the heat exchanger operating at a first temperature range and passes through a portion of the heat exchanger operating at a second, different temperature range.

9. The method of claim 1, wherein the bypass portion of the recycled stream comprising $CO_2$ bypasses at least a portion of the heat exchanger by being combined with the first portion of the recycled stream comprising $CO_2$ after the first portion of the recycled stream comprising $CO_2$ has passed through at least a portion of the heat exchanger.

10. The method of claim 1, wherein first portion of the recycled stream comprising $CO_2$ is divided to form a third portion of the recycled stream comprising $CO_2$, and wherein the third portion of the recycled stream comprising $CO_2$ is combined with an oxygen stream to form the oxidant stream.

11. The method of claim 1, wherein the second portion of the recycled stream comprising $CO_2$ is combined with an oxygen stream before the second portion of the recycled stream comprising $CO_2$ bypasses the at least a portion of the heat exchanger such that the second portion of the recycled stream comprising $CO_2$ is provided as the oxidant stream.

12. The method of claim 1, wherein after the second portion of the recycled stream comprising $CO_2$ is combined with the oxygen stream but before the second portion of the recycled stream comprising $CO_2$ is passed to the combustor, the second portion of the recycled stream comprising $CO_2$ including the combined oxygen stream is heated in a heat exchanger.

13. The method of claim 1, wherein one or more of the following conditions is met:
the combustion stream is at a temperature of 700° C. to 1,600° C.;
the turbine exhaust stream is at a pressure of 1 bar to 50 bar;
processing the cooled turbine exhaust stream comprises separating water from the cooled turbine exhaust stream;
the first portion of the recycled stream comprising $CO_2$ is pumped to a pressure of 100 bar to 500 bar;
the second portion of the recycled stream comprising $CO_2$ is pumped to a pressure of 80 bar to 140 bar;
processing the second portion of the recycled stream comprising $CO_2$ in the compressor comprises increasing the pressure to 200 bar to 500 bar.

14. The method of claim 1, further comprising mixing an oxygen stream from an air separation plant with one of the first portion of the recycled stream comprising $CO_2$ and the second portion of the recycled stream comprising $CO_2$ to form the oxidant stream.

15. The method of claim 1, wherein a quantity of the second portion of the recycled stream comprising $CO_2$ that bypasses the at least a portion of the heat exchanger is sufficient to give a positive minimum temperature difference in the heat exchanger of 2° C. to 20° C.

16. The method of claim 1, wherein the compressor processing the second portion of the recycled stream comprising $CO_2$ has an inlet pressure of 65 bar to 260 bar.

17. A power production system comprising:
a combustor configured to receive a plurality of streams and having an outlet;
a turbine having an inlet in fluid connection with the outlet of the combustor and having an outlet;
a generator configured for production of electrical power and in a power-generating connection with the turbine;
a heat exchanger comprising a plurality of inlets and outlets, the heat exchanger being configured for operation over a range of different temperatures, wherein the heat exchanger has an inlet and an outlet in fluid connection with the turbine;
at least one unit arranged to receive a stream from the heat exchanger and arranged to output a recycled stream comprising $CO_2$;
at least one pump configured to receive at least a first portion of the recycled stream comprising $CO_2$, and optionally a second portion of the recycled stream comprising $CO_2$ and increase a pressure of at least the first portion of the recycled stream comprising $CO_2$, and optionally the second portion of the recycled stream comprising $CO_2$, the at least one pump having an outlet in fluid connection with an inlet of the heat exchanger;
a bypass compressor having an inlet arranged to receive the second portion of the recycled stream comprising $CO_2$, and having an outlet arranged such that the second portion of the recycled stream comprising $CO_2$ is configured to bypass at least a portion of the heat exchanger.

18. The power production system of claim 17, wherein the heat exchanger comprises a plurality of sections.

19. The power production system of claim 18, wherein the plurality of sections are a plurality of separate heat exchangers.

* * * * *